US008959920B2

(12) United States Patent  
Clements

(10) Patent No.: US 8,959,920 B2  
(45) Date of Patent: Feb. 24, 2015

(54) AIRCRAFT ENGINE FUEL PUMP BEARING FLOW AND ASSOCIATED SYSTEM AND METHOD

(75) Inventor: Martin A. Clements, North Royalton, OH (US)

(73) Assignee: Eaton Corporation, Cleveland, OH (US)

( * ) Notice: Subject to any disclaimer, the term of this patent is extended or adjusted under 35 U.S.C. 154(b) by 553 days.

(21) Appl. No.: 13/446,740

(22) Filed: Apr. 13, 2012

(65) Prior Publication Data

US 2013/0269365 A1 Oct. 17, 2013

(51) Int. Cl.  
*F02C 7/232* (2006.01)

(52) U.S. Cl.  
USPC ........... 60/734; 60/39.08; 60/39.281; 60/783; 184/6.11; 417/281; 417/366; 417/423.12; 417/423.13; 137/563

(58) Field of Classification Search  
USPC ............ 60/734, 39.08, 39.281, 783; 418/102; 184/6.11; 417/423.12, 423.13, 366, 417/372, 281; 137/563  
See application file for complete search history.

(56) References Cited

U.S. PATENT DOCUMENTS

| | | | | |
|---|---|---|---|---|
| 2,598,674 A | * | 6/1952 | Burgess | ........................... 60/243 |
| 4,245,465 A | | 1/1981 | Milo | |
| 4,569,196 A | | 2/1986 | Waddington et al. | |
| 4,597,407 A | | 7/1986 | Smith | |
| 5,118,258 A | * | 6/1992 | Martin | .............................. 417/3 |
| 6,058,694 A | | 5/2000 | Ackerman et al. | |
| 6,526,743 B2 | | 3/2003 | Maker et al. | |
| 6,810,674 B2 | | 11/2004 | Clements | |
| 7,114,336 B2 | * | 10/2006 | Hommema | ...................... 60/734 |
| 7,314,351 B2 | * | 1/2008 | Kuroda | .......................... 417/251 |
| 2002/0184884 A1 | * | 12/2002 | McCarty | ......................... 60/773 |
| 2010/0242431 A1 | | 9/2010 | Baker | |
| 2011/0150682 A1 | | 6/2011 | Nyzen et al. | |

OTHER PUBLICATIONS

PCT US/2011/035474 International Search Report and Written Opinion, mailed Jul. 11, 2013.

* cited by examiner

*Primary Examiner* — Phutthiwat Wongwian  
*Assistant Examiner* — Steven Sutherland  
(74) *Attorney, Agent, or Firm* — Fay Sharpe LLP

(57) ABSTRACT

An assembly or system is provided for selectively regulating journal bearing lubrication between at least first and second levels in an aircraft engine. A high pressure pump includes movable portions at least in part supported by a journal bearing. A selector valve is configured to selectively supply lubrication flow to the journal bearing. In addition, a relief valve is configured to receive a signal from the selector valve defining a pressure level at which the relief valve should relieve pressure.

20 Claims, 3 Drawing Sheets

AIRCRAFT ENGINE FUEL PUMP BEARING FLOW AND ASSOCIATED SYSTEM AND METHOD

BACKGROUND

This disclosure relates to fuel pumps, and to fuel pumps used in aircraft engines. More particularly, this disclosure relates a system and method for providing adequate and reliable fluid flow to a journal bearing of the fuel pump during different modes of operation.

Aircraft engine fuel pumps are often sized at engine start conditions, that is windmill re-light. Using this parameter for design purposes results in a fuel pump that is unnecessarily oversized at other conditions. By turning off journal bearing lubrication flow, more flow can be delivered at the pump discharge. However, this journal bearing lubrication flow must be turned back on at high-speed/high-pressure conditions. A reliable assembly and method of turning this flow off and on is required.

In addition, there is a desire to protect against pump operation at higher speed/higher pressure conditions if the journal bearing lubrication flow has been turned off. Thus, a need exists for a system and method of reliably selecting the use or non-use of bearing flow, and in inhibiting pump/engine fuel system operation at higher speed/higher pressure conditions should the user bearing flow not be selected.

In a typical aircraft engine fuel pump system, there is a constant supply of bearing lubricant flow. More particularly, there is inlet flow to a boost stage where the flow is raised to a low pressure state and then output to a high pressure pump, usually a gear pump. A portion of the high pressure flow from the gear pump is recirculated to a relief valve. The relief valve is normally spring biased toward a closed position so that flow is directed to a downstream end use at a predetermined flow and pressure. A signal or reference pressure from the boost stage at a location upstream of the gear pump is provided to the relief valve. The relief valve also receives pressure from the discharge side of the high pressure pump and when the pressure reaches a level that is above the reference/signal pressure from the boost stage (in combination with any biasing force provided by the spring, for example), then the relief valve opens and allows flow to circulate around the recirculation path or loop. The recirculating flow from the relief valve combines with the outlet tlow from the boost stage and the combined flow is inlet to the high pressure pump. The relief valve caps the pressure level.

One example of controlling flow to the bearings during different pump modes or operation is shown and described in U.S. Pat. No. 6,526,743—Maker, et al. Particularly, the fuel control includes a metering or selector valve that regulates a desired flow of fuel to an engine. The metering valve provides a low, regulated flow during low speed operation of the engine. When an intermediate to high flow is required, the position of the valve member of the metering valve is altered to provide high pressure auxiliary flow to the pump rotor bearing surfaces.

A need exists for the ability to switch bearing flow between low and high pressure in a manner that protects the pump from not switching on the bearing flow at a predetermined system level. For example, when the engine is accelerated, pressure increases and gets capped by the relief valve function being at a low setting based on the low-pressure bearing supply. In that case, the engine will reach a certain level of acceleration (certain speed level) and stay at that level. In this manner, the system is not switched to a high setting when there has not been a corresponding increase in the bearing feed pressure. Since the selector valve provides the feed to the bearings, a need exists to inform the relief valve whether it should be operating at a low or high pressure. Moreover, the need to reliably switch between at least two pressure levels of the relief valve should be reliable and economical to implement.

SUMMARY

A reliable system or assembly for turning journal bearing lubrication flow on and off between low speed/low-pressure conditions and high-speed/high-pressure conditions is provided.

The assembly includes a high-pressure pump for pressurizing fluid flow. A journal bearing at least in part rotatably supports the high-pressure pump shaft. A selector valve is configured to selectively supply lubrication flow to the bearing between at least first and second levels. A relief valve is configured to receive a signal from the selector valve defining a pressure level at which the relief valve should relieve pressure.

The relief valve is preferably located in a recirculation passage extending from an outlet of the high pressure pump to an inlet thereof.

When the selector valve receives a signal indicative of pressure at the outlet of the high-pressure pump, the selector valve provides a signal to the relief valve.

The relief valve includes a first biasing member that at least partially defines the low pressure level.

Flow from the high pressure pump at least partially defines the high pressure level.

The selector valve receives a low pressure signal from a boost stage pump, and a high pressure signal from the high-pressure pump. The selector valve selectively supplies either the low pressure signal to the relief valve and the bearing lubrication flow, or supplies the high-pressure signal to the relief valve and corresponding bearing lubrication flow.

A method of selectively regulating journal bearing lubrication between at least first and second levels in an aircraft engine includes pressurizing fluid flow with the pump. The method includes rotatably supporting the pump at least in part with a journal bearing. The method includes selectively supplying different lubrication flow amounts to the journal bearing during different pump operations. The method includes configuring a selector valve to define a first pressure level at which a relief valve should relieve pressure and thereby establish a first flow rate to the bearing, and defining a different, second pressure level in response to increased system demand that establishes a different, second flow rate to the bearing and also established a second pressure level at which the relief valve should relieve pressure.

The method further includes providing a signal from downstream of the high-pressure pump to serve as a reference signal to the selector valve.

The configuring step includes using the signal from an output of the selector valve to be a reference to the relief valve.

The method includes sending an output from the selector valve to the journal bearing and also sending a signal to the relief valve to switch the relief valve between first and second pressure levels.

One benefit is the ability to properly size the pump to meet system needs.

Another advantage resides in a reliable means of switching bearing lubrication flow between low speed/low pressure and high speed/high pressure conditions.

Yet another benefit is associated with protecting the pump operation at higher speed/higher pressure conditions.

Still another advantage results from reliably selecting use or non-use of bearing flow, and in turn inhibiting pump/engine fuel system operation at higher speed or higher pressure conditions should the use of bearing flow not be selected.

A still further benefit is associated with the simple, effective manner of achieving these improvements.

Other benefits and advantages will become more apparent to those skilled in the art upon reading and understanding the following detailed description.

DETAILED DESCRIPTION

Figure 1:
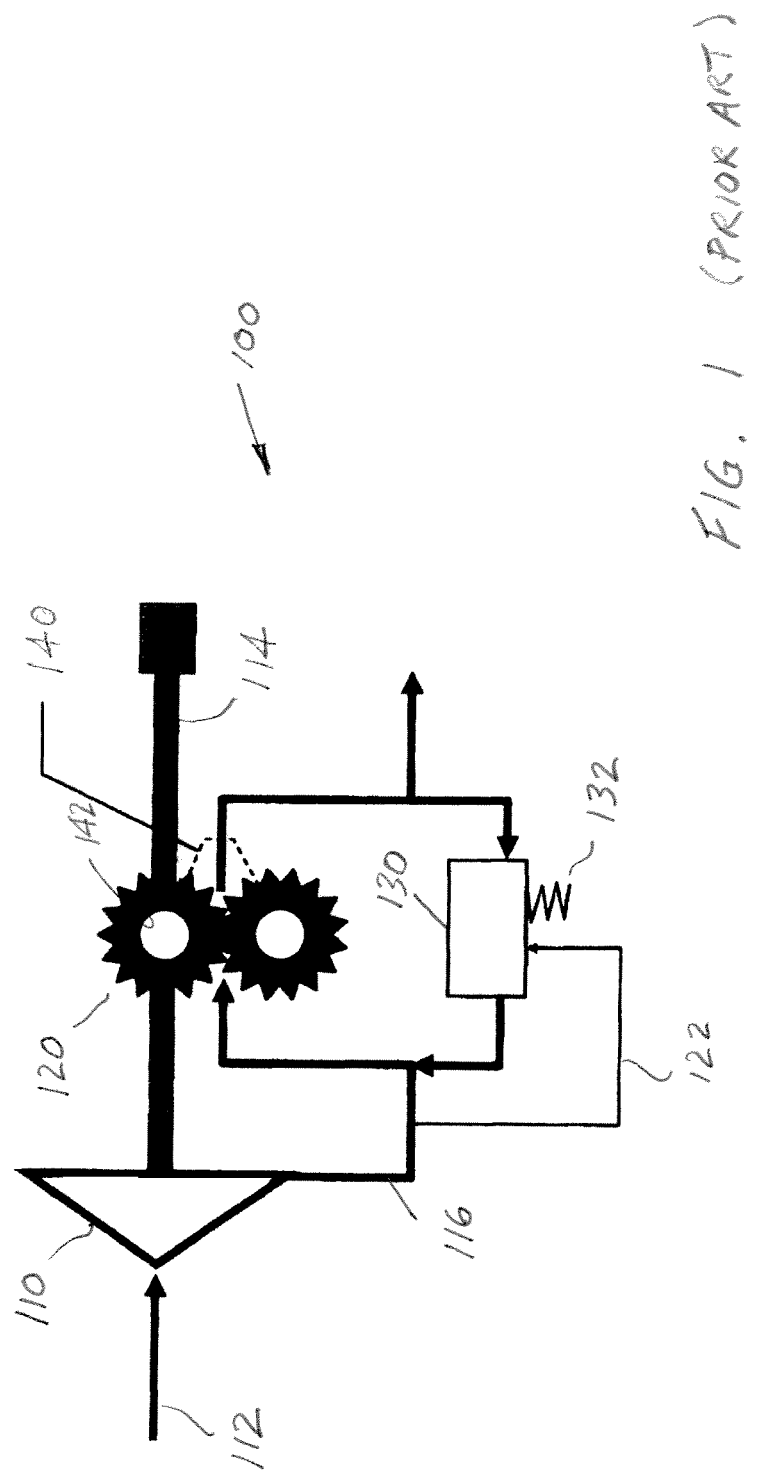
FIG. 1 is a schematic representation of a typical pump with a constant supply of bearing lubrication flow.

FIG. 1 is a typical pump that provides a constant supply bearing lubrication flow to the journal bearing of a pump such as a high pressure stage pump. More particularly, the system 100 includes a first or boost stage pump 110 that is schematically represented as a centrifugal pump. Fluid is inlet at 112 to the boost stage pump 110 which is rotated by drive shaft 114. Output 116 from the boost stage pump 110 is provided to a second pump or high pressure stage pump 120 downstream of the boost stage. The high pressure pump 120 is also driven by shaft 114. A reference signal 122 is also provided from the outlet 116 of the boost stage 110 to a relief valve 130. The relief valve 130 is biased toward a closed position by means of a biasing member such as spring 132. The relief valve 130 receives flow from the high pressure pump 120 and if the pressure of the output flow from the high pressure pump provides a force that exceeds the combined signal 122 from the boost stage pump 110 and the biasing force 132, the relief valve opens and recirculates a portion of the high pressure pump outlet flow toward the inlet of the high pressure pump. Bearing lubrication flow 140 is taken from the discharge of the high pressure pump 120 and fed to the journal bearings 142 of the high pressure pump. The arrangement of FIG. 1 provides a constant supply bearing lubricant flow.

Figure 2:
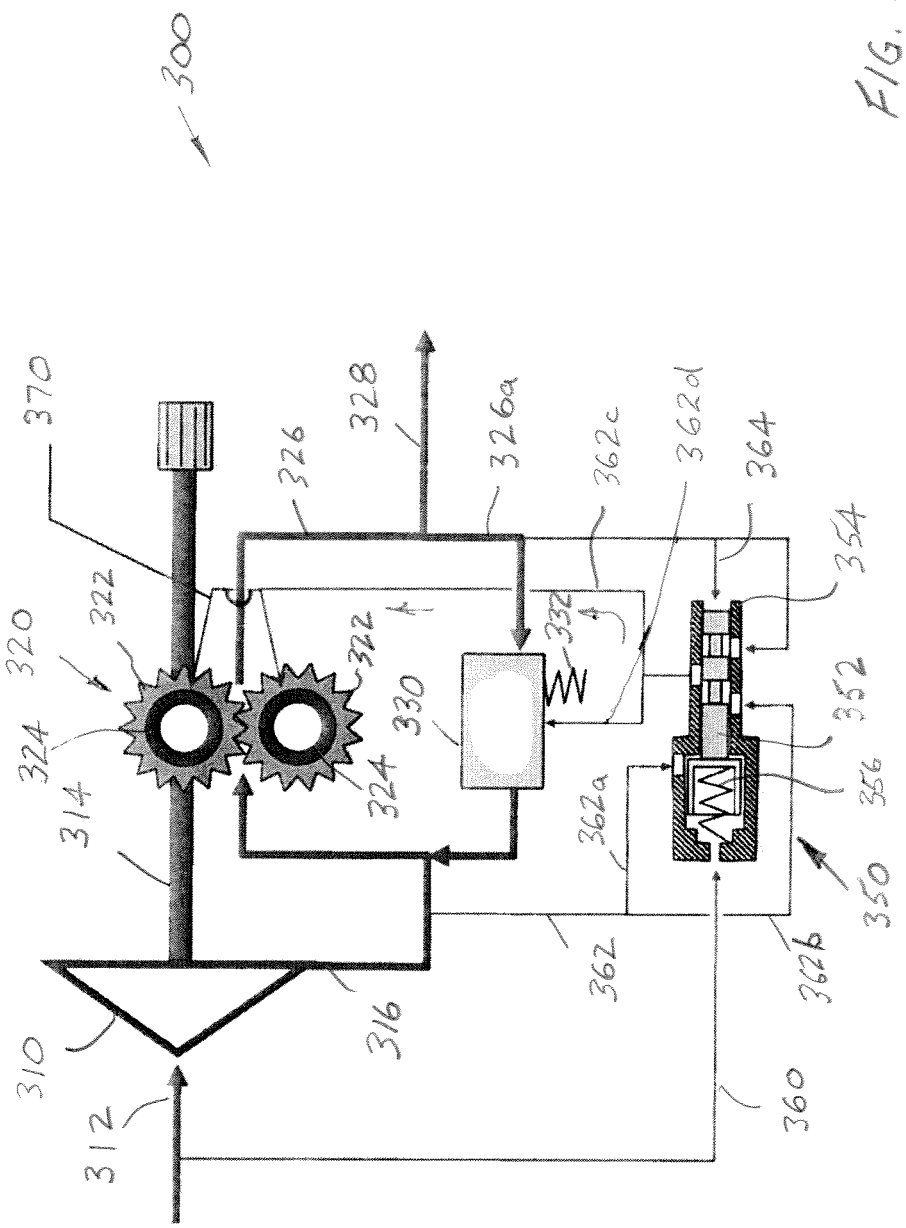
FIG. 2 is a schematic representation of a pump with a bearing lubrication flow shown in a starting mode.
Figure 3:
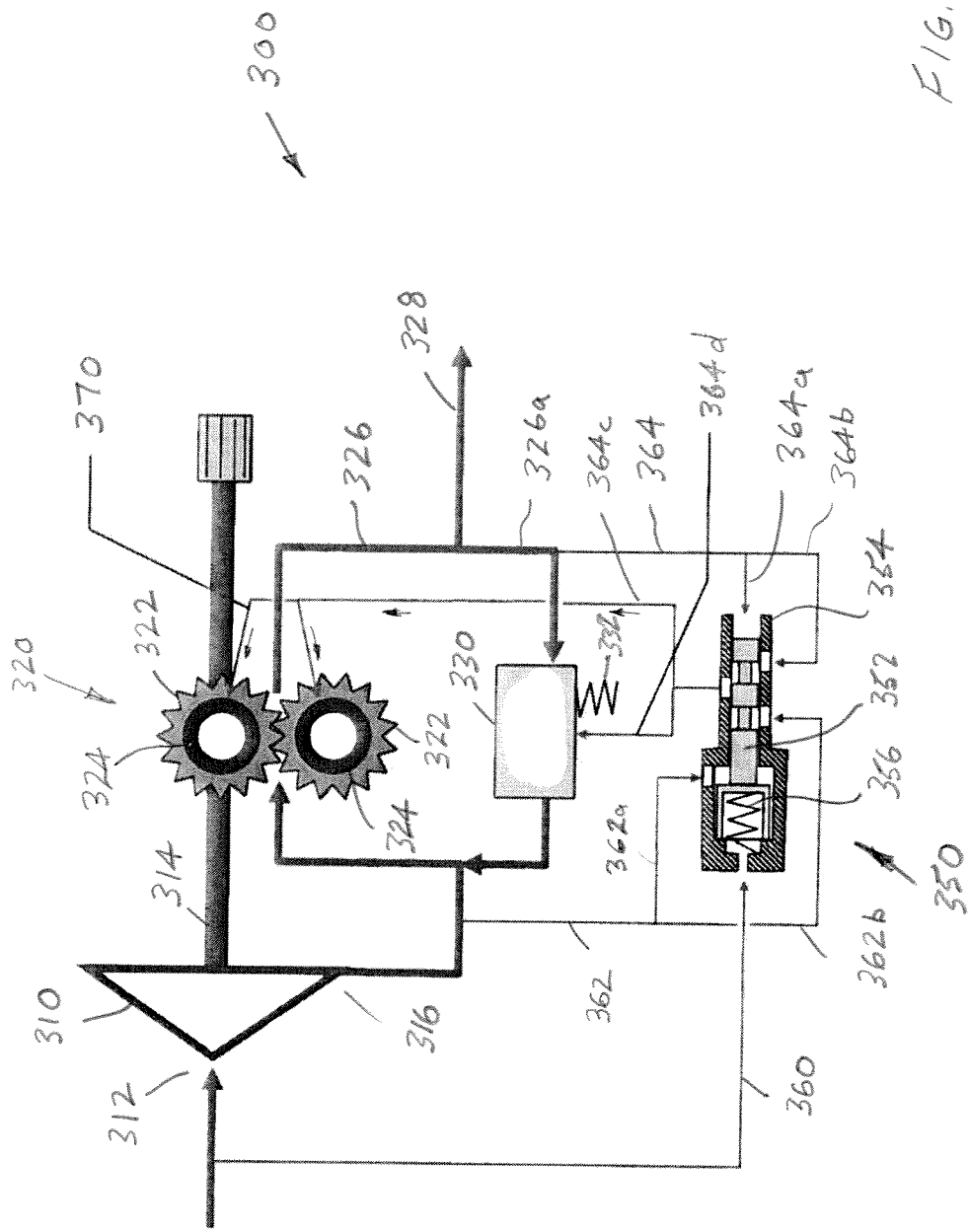
FIG. 3 is a schematic illustration of the pump with bearing lubrication flow shown in FIG. 2 but in the normal operating mode.

FIGS. 2 and 3 illustrate the improved system 300 of the present disclosure. More particularly, the bearing lubrication flow selection system 300 includes a first pump or boost stage pump 310 that receives flow from an upstream location at inlet 312. The boost stage pump 310 is rotated at a high speed by shaft 314, and is schematically represented as a centrifugal pump, although other types of pumps may be used without departing from the scope and intent of the present disclosure. Pressurized flow is provided at outlet 316 of the boost stage pump 310. This outlet flow, in turn, is directed downstream toward a second pump or high pressure stage pump 320. The high pressure stage pump 320 is shown as a gear pump driven by shaft 314. Again, although a gear pump is schematically represented as a preferred high pressure stage pump, one skilled in the art will appreciate that other high pressure stage pumps could be used. Cooperating gears 322 of the gear pump 320 impart energy to the fluid and the rotating portions of the pump are at least in part supported by journal bearings represented by reference numerals 324. Flow 326 from the high pressure stage pump 320 is directed toward a downstream end use(s) represented by reference numeral 328. In addition, a portion 326a of the outlet flow 326 is directed toward a relief valve 330. The relief valve is biased toward a closed position by a biasing member such as spring 332. If the biasing force of the relief valve 330 is exceeded, the valve opens and flow 326 is directed toward the inlet of the high pressure stage pump 320.

A selector valve 350 is incorporated into the system 300. The selector valve 350 in one preferred arrangement includes a valve member 352 movably received in the housing 354. A biasing member such as spring 356 urges the valve member 352 toward a first position (rightwardly as shown in FIG. 2). In addition, a first reference signal 360 is provided from the inlet flow 312 to the boost stage pump and the first reference signal is directed toward a first portion, namely a first end, of the valve member 352. Further, a second reference signal 362 is provided from the outlet flow 316 of the boost stage pump. A first portion or first branch 362a of the second reference signal 362 is directed toward the valve member 352 and acts against the biasing force imposed by the spring 356 and the first signal 360. A second portion or second branch 362b of the second signal is directed toward a port of the selector valve housing 354. This second portion 362b is further split to form a first sub-portion or sub-branch 362c that supplies bearing flow 370 to the journal bearings 324 of the high pressure stage pump 320 and a second sub-portion or sub-branch 362d that provides a signal to the relief valve 330. Still further, a third signal 364 extends from the outlet flow 326 of the high pressure stage pump. As shown in FIG. 2, the third signal is directed toward the right-hand of the valve member and, in conjunction with the first branch 362a of the second signal, opposes the combined force provided by spring 356 and the first signal 360.

Thus, in the starting mode of the system 300, the combined force imposed on the valve member 352 by the first branch 362a of the second signal and the third signal 364 is less than the combined force of the spring 356 and the first signal 360. Thus, the valve member 352 adopts the position shown in FIG. 2 where the journal bearings 370 are provided flow from the boost stage discharge. In addition, a first or low reference pressure of the relief valve 330 is established by the spring 332 and the second signal 362 (particularly, portion 362d) from the outlet of the boost stage pump 310. By way of example only, low pressure may be at approximately 500 psi, although this level at which the relief valve opens is not deemed to be limiting.

In FIG. 3, the system 300 is shown in a second or normal operating mode. The high pressure stage pump 320 is operating at a speed that provides an increased pressure in the outlet flow 326. The pressure provided by the third signal 364 increases on the right-hand end of the valve member and, in conjunction with the first portion 362a of the second signal 362, overcomes the combined force provided by the first signal 360 and the spring 356. Thus as illustrated, the valve member 352 has moved to a second position, i.e. leftwardly, where flow from the outlet of the high pressure stage pump 320 can now communicate through the selector valve 350. More particularly, first portion 364a of the third signal acts on the right-hand end of the valve member 352, a second portion 364b of the third signal is provided to the valve housing port, and is further split into a first portion or first sub-branch 364c that directs flow from the high pressure stage pump to the journal bearings, and a second portion or second sub-branch 364d provides a second or high pressure reference of the relief valve 330. Thus, the second reference pressure of the relief valve is established by the spring 332 and the third signal 364 (364d) from the outlet of the high pressure stage pump 320.

By way of example only, high pressure may be at approximately 1500 psi, although this pressure level at which the relief valve opens is not deemed to be limiting.

Consequently, a pump with the bearing lubrication flow selection is provided by system 300. In the starting mode of FIG. 2, the lower, right-hand port of the selector valve is closed to prevent flow to the bearing lubrication flow. Instead, the pressure that feeds the journal bearings is provided by the lower left-hand side of the selector valve which is the boost stage discharge or outlet fluid. This flow from the boost stage discharge feeds both the journal bearing supply and also feeds the reference pressure for the relief valve 330. There is not a large load on the bearings in the stationary mode and therefore the journal bearings do not require a lot of flow. The same is true of an idle condition of the engine, i.e. the journal bearings do not need a lot of flow.

However, when a higher power level required, a high pressure feed for the journal bearings is required to provide healthy, well lubricated journal bearings. Thus, in the operating mode of FIG. 3, the selector valve 350 switches to a second position. When this selector valve moves to the second position, the output pressure of the gear pump 320 is fed through the selector valve. The higher pressure/higher flow then feeds the journal bearing 370 and also establishes the second reference pressure of the relief valve 330. The relief valve now operates at a high-pressure, e.g. 1500 psi, whereas in the starting mode the relief valve may relieve around 500 psi.

The signal from the output of the selector valve is used as a reference for the relief valve in order to "instruct" or "tell" the relief valve what pressure setting level the relief valve should be relieving, i.e., either low or normal. Instead of taking the output from the selector valves and only feeding the journal bearings as in the prior art, this arrangement also advantageously sends a signal to tell the relief valve of the system whether it should be relieving at low pressure or any higher pressure.

The disclosure is not limited to the disclosed embodiment, and other elements, improvements, and variations are also within the scope of the disclosure.

I claim:

1. An assembly for selectively regulating journal bearing lubrication between at least first and second levels in an engine comprising:
   a pump for pressurizing aircraft engine fuel;
   a journal bearing for rotatably supporting at least a part of the pump;
   a selector valve configured to selectively supply lubrication flow to the journal bearing; and
   a relief valve configured to receive a signal from the selector valve defining a pressure level at which the relief valve should relieve pressure.

2. The assembly of claim 1 wherein the relief valve is received in a recirculation passage extending from an outlet of the pump to an inlet thereof.

3. The assembly of claim 2 wherein the selector valve receives the signal indicative of pressure at the outlet of the pump and selectively provides the signal to the relief valve.

4. The assembly of claim 1 wherein the selector valve receives the signal indicative of pressure at an outlet of the pump and selectively provides the signal to the relief valve.

5. The assembly of claim 1 wherein the relief valve is configured to alternately direct lubrication flow to the bearing at a low-pressure, first level and any high-pressure, second level.

6. The assembly of claim 5 wherein the relief valve includes a first biasing member that at least partially defines the low pressure level.

7. The assembly of claim 6 wherein flow from a boost pump at least partially defines the low pressure level.

8. The assembly of claim 5 wherein the flow from the pump at least partially defines the high pressure level.

9. The assembly of claim 8 wherein the relief valve includes a first biasing member that at least partially defines the high pressure level.

10. The assembly of claim 1 wherein the selector valve is configured to receive a low pressure signal from a boost pump and a high-pressure signal from the pump, and selectively supplies either the low pressure signal or the high-pressure signal to the relief valve.

11. A method of selectively regulating journal bearing lubrication between at least first and second levels in an aircraft engine comprising:
    pressurizing aircraft engine fuel with a pump;
    rotatably supporting the pump at least in part with a journal bearing;
    selectively supplying different lubrication flow amounts to the journal bearing during different pump operations; and
    configuring a selector valve to define a first pressure level at which a relief valve should relieve pressure and thereby establish a first flow rate to the journal bearing, and defining a different, second pressure level in response to increased system demand that establishes a different, second flow rate to the journal bearing.

12. The method of claim 11 wherein the configuring step includes providing a signal from downstream of the high pressure pump to serve as a reference signal to the selector valve.

13. The method of claim 12 wherein the configuring step includes using the signal from an output of the selector valve to be a reference to a relief valve.

14. The method of claim 11 wherein the configuring step includes using the signal from an output of the selector valve to be a reference to a relief valve.

15. The method of claim 11 wherein an output from the selector valve is sent to the bearing and also sent as a signal to a relief valve to switch the relief valve between first and second pressure levels.

16. The method of claim 15 wherein the relief valve relieves system pressure at a first, low pressure or a second, higher pressure.

17. An aircraft engine fuel bearing flow system comprising:
    a high pressure pump for pressurizing engine fuel;
    a journal bearing supporting the pump and receiving engine fuel to lubricate at least a part of the journal bearing;
    a relief valve that controls a bearing flow pressure level; and
    a selector valve that supplies the engine fuel to the journal bearing, and also supplies a signal to the relief valve for use as a reference that establishes an operational level of the relief valve.

18. The system of claim 17 further comprising a boost pump that provides a low pressure signal to the relief valve.

19. The system of claim 18 wherein the high pressure pump provides a high pressure signal to the relief valve.

20. The system of claim 19 wherein the high pressure signal is routed through the selector valve before reaching the relief valve.

* * * * *